United States Patent [19]

Loeb et al.

[11] 3,863,503
[45] Feb. 4, 1975

[54] MULTISPEED, CHAINLESS VEHICLE DRIVE SYSTEM

[76] Inventors: David C. Loeb, 7227 S. Claiborne Ave., New Orleans, La. 70125; Robert Trestman, 6649 Memphis St., New Orleans, La. 70124

[22] Filed: Apr. 30, 1973

[21] Appl. No.: 355,592

[52] U.S. Cl............... 74/347, 74/366, 280/238
[51] Int. Cl............................................. F16h 3/30
[58] Field of Search ...... 74/347, 366, 373; 280/238, 280/260

[56] References Cited
UNITED STATES PATENTS
1,846,187  3/1930  Coulter............................ 74/366 X FOREIGN PATENTS OR APPLICATIONS
650,494  2/1951  Great Britain.................... 280/238
617,937  2/1961  Italy................................. 280/238
349,771  12/1904  France............................. 280/238
24,759  11/1899  Great Britain.................... 280/238
18,368  11/1895  Great Britain.................... 280/238

Primary Examiner—Samuel Scott
Assistant Examiner—P. S. Lall
Attorney, Agent, or Firm—Pugh & Laiche

[57] ABSTRACT

A multispeed, chainless bicycle drive and transmission system wherein the drive train includes a shiftable drive shaft connecting the pedal crank shaft and driving wheel by means of vertical gear wheels mounted transversely thereon having a multitude of concentric series of gear teeth for providing different drive or gearing ratios. The geared drive shaft is moved from one series of gear teeth to another on one or both of the gear wheels to change the gear ratio by means of two independently moving, splined, concentric shaft members which mate through contact gears with the selected gear teeth series. The splined shaft members are mounted within a tubular housing via three ball bushings which permits both longitudinal and rotational movement of the enclosed shaft members. A spring-loaded ball system is used to assure proper relative positioning of the splined shafts with respect to the selected gear teeth series.

9 Claims, 14 Drawing Figures

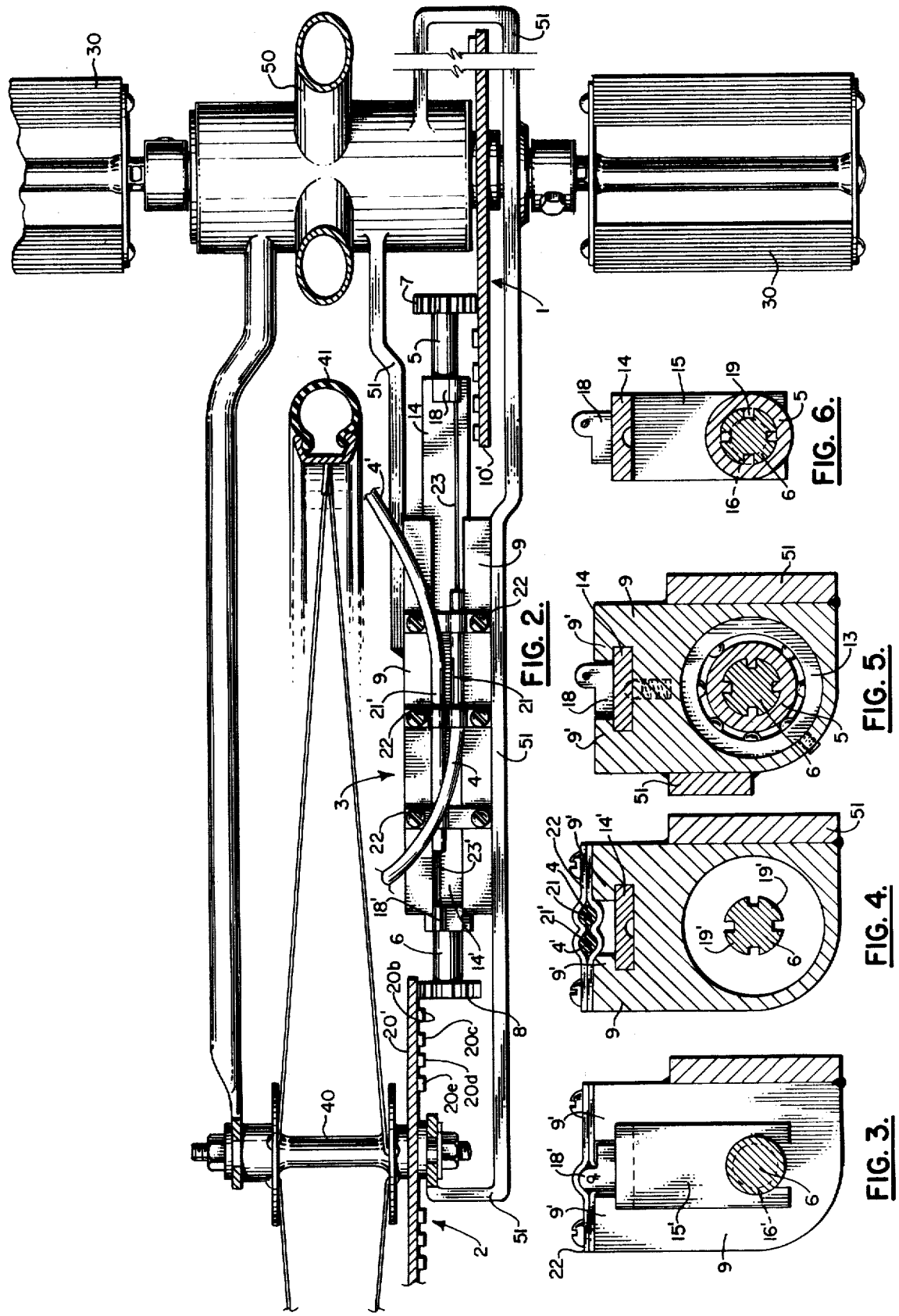

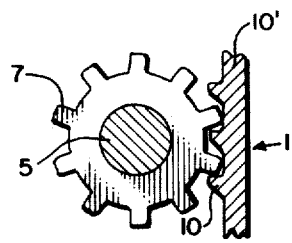
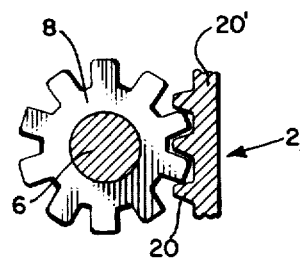
FIG. 7.    FIG. 8.
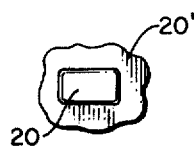
FIG. 9.    FIG. 12.
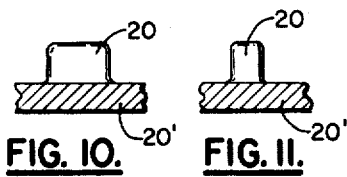
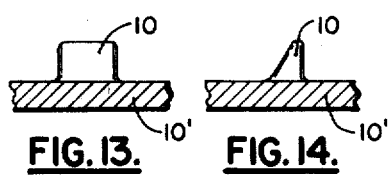
FIG. 10.   FIG. 11.    FIG. 13.   FIG. 14.

MULTISPEED, CHAINLESS VEHICLE DRIVE SYSTEM

BACKGROUND OF THE INVENTION

The present invention relates to a multispeed drive system for vehicles which are occupant propelled, particularly bicycles, of the chainless type, and more particularly to a shiftable transmission gear system for changing the drive or gear ratios.

At the present time the bicycle industry is undergoing a tremendous boom period, with over eight-and-a-half million bikes being sold in the U.S. in 1971, half of which had multispeed transmission. The increased utility of the bicycle allowed by the availability of multi speed transmissions is one of the basic factors behind the boom.

The most common multispeed transmission found in the industry today is the derailleur gear chain type. A derailleur gear chain type transmission generally comprises a freewheel with two or more sprockets, a mechanism that alters the line of the chain and causes it to jump from one sprocket to another, and a spring-operated jockey pulley or tension pinion to take up or let out the slack in the chain. In this way various gear ratios can be selected. Although the principle is the same in all derailleur gears, the mechanisms produced by the various manufacturers of course differ in detail.

However, the derailleur system is relatively expensive, complex, and subject to substantial maintenance and breakdown problems, primarity due to the use of the chain, the actual movement of the chain from one sprocket to another to achieve a gear ratio change, and the limitation of being only able to shift while the bike is in motion. The present invention is designed to overcome these problems by means of a highly reliable and straightforward chainless drive system which has a vastly improved, sturdy, and highly reliable transmission system which can be shifted when in motion or at rest. Moreover, in addition to overcoming these problems, the present invention provides much greater utility and flexibility, allowing the possibility of a far wider range of gear ratio changes than that heretofore achieved.

The present invention achieves these results by means of a chainless mechanical drive system that includes two vertical gear wheels having concentric series of gear teeth circularly arranged thereon, the two gear wheels being interconnected by a tubular drive shaft, axially variable in length and controllable by a gear shift mechanism.

Although chainless drive systems similar in general principle to the present invention have been known for some time, indeed since at least 1891 as shown in U.S. Pat. No. 446,354 to Kane, multispeed versions thereof have been impractical and commerically unsuccessful, it is believed, until the present invention. Other typical examples of the chainless drive systems of the prior art are shown in the U.S. Pat. Nos. to Smallwood (No. 479,470), Murphy et al. (614,969), Oberhammer (624,964), Hussey (2,378,634) and Delane (628,453).

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 2 is a top, cross-sectional view of the chainless drive system of FIG. 1, taken along section lines 2—2 thereof; while FIGS. 3, 4, 5, 6, 7 and 8 are detailed, cross-sectional views of various portions of the chainless drive system of FIG. 1, taken along section lines 3—3, 4—4, 5—5, 6—6, 7—7, and 8—8, respectively, thereof.

FIGS. 9, 10 and 11 are partial and close-up top, lateral side, and axial side views, respectively, of the rectangular gear tooth structure on the rear gear wheel; while FIGS. 12, 13 and 14 are top, lateral side, and axial side views, respectively, of the beveled or triangular gear tooth structure on the front gear wheel.

DETAILED DESCRIPTION OF THE PREFERRED EMBODIMENT

Figure 1:
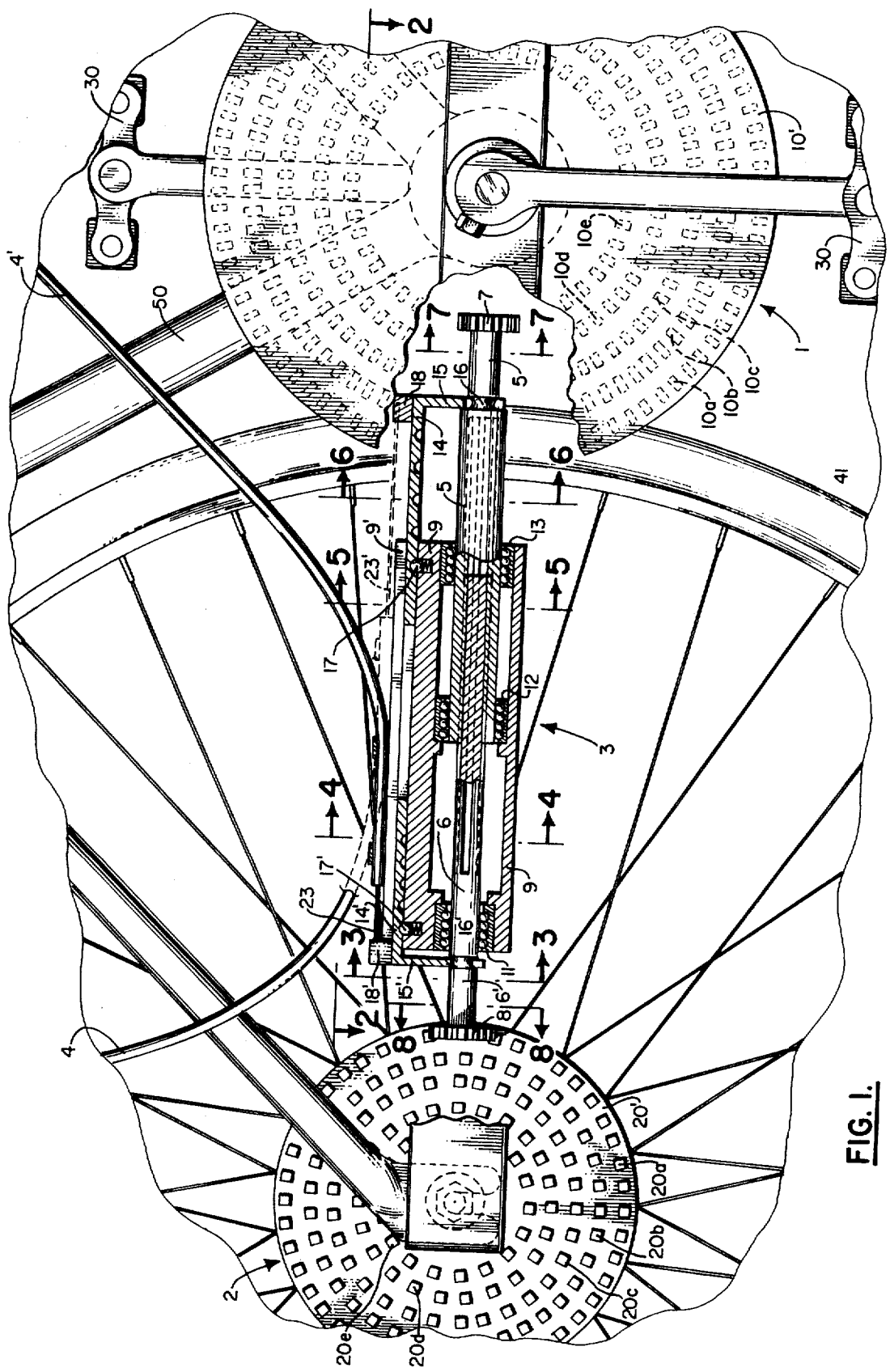
FIG. 1 is a side view, partially cut-away and partially in cross-section, of the chainless drive system as applied to a bicycle (partially shown) showing the inner structure of the shiftable drive shaft interconnecting the dual drive gear wheels.

As shown in FIGS. 1 and 2, the preferred emboidment of the multispeed, chainless vehicle drive transmission system of the present invention, as applied to a bicycle, comprises two vertically disposed gear wheels 1, 2, a variable length drive shaft 3, and a gear shift system acutated by cables 4, 4. The gear wheels 1, 2 are mounted at the middle and at the back of the bicycle, respectively, the former at the pedals 30, and the latter at the hub 40 of the rear bicycle wheel 41.

Each gear wheel 1, 2 has circularly arrayed, concentric rows 10 a–e, 20 a–e, of drive-teeth 10, 20, respectively, on one face. On the front gear wheel 1, the teeth 10 are on the inside face of the basic disc structure 10' facing the bicycle frame 50; while the teeth 20 of the rear gear wheel 2 face away from the bicycle wheel 41.

The drive shaft 3 is constructed as follows. The drive shaft itself is formed of two independently and axially moveable, splined tubes or shafts 5, 6. On the far end of each tube 5, 6 is a contact gear 7, 8, respectively, which meshes with the gear wheel 1, 2, respectively, at the end. The tubes 5, 6 are supported by three ball bushings 11, 12, 13 equally spaced in a sleeve 9 fixedly mounted on the drive support frame 51.

The shifting of gear ratios is accomplished with an adaptation of a push-pull cable system similar to that used for the derailleur shift. As explained more fully below, lever operated cables 4, 4' move sliding bars 14, 14' mounted moveably within the outer sleeve surface 9' of the sleeve 9. The bars 14, 14' extend beyond the sleeve 9 to form a perpendicular fork projection 15, 15' which fixedly connects to the shaft members 5, 6, respectively. The "fork" 15, 15' fits around and within a groove 16, 16' cut about the shaft 6, 6'. The front and rear shaft sections 5, 6 are individually moveable, affording independent forward and rear gear ratio selections.

In contrast to the derailleur, which must be in motion for shifting, the transmission of the present invention may be at rest when shifting. The gear wheels 1, 2 are each constructed and mounted to allow several degrees of play and act as a clutch. The bicycle's momentum during shifting remains unaffected with the use of a standard ratchet structure (not illustrated) mounted in the hub 40 of the rear bicycle wheel 41.

Power is supplied to the system by a standard pedal crank-shaft arrangement 30 connected to the center of gear wheel 1. Proper directional orientation is achieved by meshing the forward contact gear 7 with the side of the gear wheel 1 facing toward the rider's right leg, while the rear contact gear 8 drives the rear gear wheel 21 by meshing with its exposed face the side (facing away from the bicycle wheel 41). The exposed drive shaft 3 can of course be coovered by a guard (not illustrated) for safety purposes.

As stated above, each gear wheel 1, 2 comprises a flat disk 10', 20', respectively, having concentric rows of gear teeth 10, 20 respectively. The spacing between the rows of teeth need not be uniform, but should be at least the width of the teeth of the contract gears 7, 8. There are several possible alternatives to the shape of the gear teeth, for example, 1) a simple rectangular shape, as shown in FIGS. 9–11, 2) a design similar to present prior art sprocket teeth, i.e. a tapered rectangular tooth, the will eliminate much of the error caused by the radial expansion of the gear rows, or 3) a modified beveled or triangular shaped as shown in FIGS. 12–14 and as discussed below.

The front gear wheel 1 can have for example an overall diameter of 10 inches. There may be as few as one row of teeth or as many as for example seven rows of teeth (five rows 10 a–e being illustrated). The teeth can be for example approximately five mm. long along the radial direction and approximately 2 2/10 mm. wide.

The rear gear wheel 2 can have for example an overall diameter of 8 inches, with for example as many as seven rows of teeth (five rows 20 a–e being illustrated). Each tooth 20 can be nearly square with the width being twice that of the front gear teeth 10, that is with a side dimension of approximately 5 mm., or can be rectangular as illustrated.

It is noted that, because of the radial expansion of the gear rows, there results an unavoidable deviation in the spaces between the teeth of the innermost rows of teeth. To compensate for this, the radial length of the teeth may be reduced, or the error may be adjusted for by shaping the teeth so that the space between the teet remains constant/

In the rear hub 40 there is a pressure sensitive ratchet (not illustrated) that serves two purposes: (1) to prevent stress loads above the capacity of the gear surfaces from causing damage, and (2) to allow for a stopped transmission while in forward motion. Such ratchet structures are well known to those skilled in the art and hence will not be discussed in detail here.

As stated above, both gear wheels 1, 2 are mounted with one or two degrees of rotational freedom to allow easy selection of gear ratios.

Each gear wheel 1, 2 is connected to the drive shaft 3 by means of contact gears 7, 8, respectively, rigidly attached to the shaft sections or members 5, 6, respectively. The forward contact gear 7 meshes with the inner surface of the front gear wheel 1, and the rear contact gear 8 meshes with the outer surface of the rear gear wheel 2, thus insuring proper directional rotation of the two. Each contact gear can possess for example 10 teeth as illustrated in FIGS. 7 and 8, yet the difference in the teeth size thereof as illustrated provides a one-to-two, front-to-rear ratio. A variance in the number of teeth in the contact gears 7, 8 will of course also provide an additional mechanical advantage, if desired.

The drive shaft 3 used is a two-piece, splined, expansion drive shaft, which axially or longitudinally expands and contracts to select various gear rows and ratios available on and between the two gear wheels 1, 2. Each concentric shaft section 5, 6 of the shaft 3 moves independently of the other in the longitudinal or axial direction, but the two sections 5, 6 rotated together because of the pressence of splines 19, 19'.

The front shaft section 5 serves as the outer shaft with respect to the rear shaft section 6, and the two shafts sections 5,6 are splined together by mating spline sections 19,19'. The interdigitating spline sections 19,19' can extend along the shaft sections 5,6 a distance of for example 5½ inches. Allowing for a minimum of 1 inch minimum over-lap between the shaft sections 5,6 to prevent flexing in the extended shaft 3, such a dimension will allow a total relative expansion distance of 4½ inches when the shaft section 5,6 are at full extension.

The expansion drive shaft 3 is supported within a tubular casing or sleeve 9 via three ball bushings 11, 12, and 13. The two outer bushings 11, 13 are fixedly mounted near the ends of the outer sleeve with the balls of the bushing 11, 13 protruding inwardly toward the shaft sections 6, 5, respectively, and the third or middle bushing 12, is affixed to the sleeve 9 near its midsection with the balls also exposed to the outer surface of the shaft section 5. This type of installation permits the middle bushing 12 to remain as close to the center of the support sleeve 9 as possible at full extension. This mounting design allows both longitudinal and rotational motion of the shaft sectins 5, 6.

For proper operation, the material used for the bushings 11–13 and the shaft sections 5, 6 should generate as little friction as possible. In addition, oil fittings can be placed along the support sleeve 9, if desired.

The shaft sections 5, 6 are relatively and slidably moved in a longitudinal or axial direction for gear shifting and ratio changing purposes by the following shifting system.

Forklike or yoke extensions 15, 15' fit into lubricant-coated grooves 16, 16' cut into each shaft section 5, 6 respectively, at a point just outside the outer sleeve 9 when the shaft 3 is in the fully retracted position. The "forks" 15, 15' are attached to flat bars 14, 14' that are slideably mounted atop the outer sleeve 9 and held in place by the housing extensions 9' in such a fashion as to permit the bars 14, 14' to slide only along their lenths. The bars 14, 14', being fixedly attached thereto, thus serve as a parallel extension of the shaft sections 5, 6 on the exterior of the main body of the sleeve 9, the bars 14, 14' moving conjointly together with the shaft sections 5, 6, respectively, with respect to the sleeve 9.

Vertical projections 18, 18' protrude vertically from the bars 14, 14' respectively, to which are attached the ends 23, 23' of the solid-ending push-pull cables 4, 4'respecitvely. The outer coverings 21, 21' on the cables 4, 4' are fixedly attached by means of suitable brackets 22 to the sleeve 9 so that, when the inner cable elements 23, 23' are moved with respect to their outer coverings 21, 21', the sliding bars 14, 14' and the attached shaft sections 5, 6 are moved with respect to the sleeve 9.

To insure that the shaft sections 5, 6 are moved the proper distance to mate with the rows of gear teeth 10, 20, there are circular holes drilled into the inner top of the outer sleeve 9 into which spring-loaded balls 17, 17' are mounted. A series of spherical depressions are formed in the bottom of the sliding bars 14, 14' to coincide with the separation spacings of the concentric rows 10 *a–e*, 20 *a–e*, respectively, of gear teeth 10, 20. When the shaft sections 5, 6 are properly positioned, the spring-loaded balls 17, 17' will be pushed into the appropriate circular depressions. This action provides an audible signal as well as a definite pressure signal to the operator as to the proper location of the shaft sections 5, 6.

It is noted that in the rear the "fork" or yoke 15' could be attached to the shifting bar 14' with a relatively simple system such as a recessed screw (not illustrated) to allow for the easy removal of the rear wheel.

As is the case with most basic mechanical systems, many variations and modifications are possible. A few exemplary ones will be described for illustrative purposes. For example, rather than just a single spring-loaded ball per shaft section, a series of such balls located around or about the periphery of the sleeve, or alternatively a laterally extended member mating with notches in the sliding bar, could be used to increase the amount of surface contact between the sliding bar and sleeve when the two are appropriately located. Also, for example, a connecting structure other than a "fork" or yoke could be used to connect the sliding bars to the shaft sections. Additionally one or more of the bushings could be fixed to one or the other shaft sections rather than the sleeve with their ball surfaces oppositely directed. Also, of course, any number of rows of gear teeth can be used, the five-and-five rows illustrated providing a total of 25 gear speeds. These are but a few of the nearly limitless number of variations possible.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A multispeed, chainless drive system for a vehicle of the occupant propelled type conmprising:

a first gear wheel mounted on a rotatable drive axle:

a second gear wheel spaced from said first gear wheel and mounted on a rotatable vehicle drive wheel, both of said gear wheels having projecting therefrom multiple rows of concentric gear teeth disposed in a circular array about the axis of rotation of said gear wheel;

variable length drive shaft means mounted between and rotatably interconnecting said first and second gear wheels for transmitting the rotating force from the drive axle and first gear wheel to the second gear wheel and ultimately to the vehicle drive wheel, both ends of said drive shaft means having contact gear means fixedly mounted thereon for mating individually with selected one of said rows of concentric gear teeth on each said gear wheels, said drive shaft means further including first and second, elongated, concentric rotatable shaft sections, each carrying one of said contact gear means, one slidably mounted in a longitudinal or axial direction within the other to vary the effective length of the said drive shaft means to position said contact gear means with different ones of said rows of concentric gear teeth, said first and second shaft sections being connected together to rotate in unison and in combination extending across from one gear wheel to the other; and gear shifting means mounted on the vehicle and attached to said shaft sections for moving the contact gear means from engagement with one row of gear teeth to another row by relatively moving said shaft sections for moving the contact gear means from engagement with one row of gear teeth to another row by relatively moving said shaft sections in a longitudinal or axial direction with respect to each other and with respect to said gear shifting means.

2. The drive system of claim 1 wherein the vehicle is a bicycle, the rotatable drive axle is pedal driven, and the drive wheel is the rear wheel of the bicycle.

3. The drive system of claim 1 wherein said two shaft sections are connected by being splined together along their axial length at least along the lengths which are centrally located between both said contact gear means.

4. The system of claim 3 wherein said drive shaft means and said gear shifting means further include the following;

an outer sleeve in which said two shaft sections are mounted for rotation and longitudinal displacement with respect to each other, said sleeve being fixedly mounted to the frame of the vehicle, both said shaft sections and said sleeve having cooperative mating positioning means on each one of said shaft sections for properly positioning said shaft sections with respect to said sleeve and with respect to each other.

5. The drive system of claim 4 wherein said positioning means includes a resilently biased projection on one of the elements and a series of mating receptacles on the other element spaced apart the same distance as said multiple rows of concentric gear teeth; whereby said projection is moved from one mating receptacle to another as said contact gear means is moved from one row to another.

6. The drive system of claim 5 wherein said resiliently biased projection is a spring-loaded ball mounted in said sleeve, and said receptacles are mating spherical depressions.

7. The drive system of claim 5 wherein each one of said shaft sections includes an exterior, parallel, elongated extension structure fixedly attached to it but positioned on the exterior of the main body of said sleeve, the mating of said projection and said receptacles occuring between said extension structure and the exterior surface of the main body of said sleeve.

8. The drive system of claim 7 wherein two, separate gear shift cable means are attached to said extension structures for individually moving said extension structures, and hence said shaft sections, with respect to said sleeve.

9. The drive system of claim 1 wherein said contact gear means are mounted on the opposite, distal ends of said shaft sections.

* * * * *